US007533335B1

(12) United States Patent
Sawicki et al.

(10) Patent No.: US 7,533,335 B1
(45) Date of Patent: May 12, 2009

(54) REPRESENTING FIELDS IN A MARKUP LANGUAGE DOCUMENT

(75) Inventors: Marcin Sawicki, Kirkland, WA (US); Robert Little, Redmond, WA (US); Brian Jones, Redmond, WA (US); Daniel Robert Snyder, Bellevue, WA (US); Andrew Bishop, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 46 days.

(21) Appl. No.: 10/731,515

(22) Filed: Dec. 9, 2003

Related U.S. Application Data (63) Continuation-in-part of application No. 10/187,060, filed on Jun. 28, 2002.

(51) Int. Cl.
*G06F 17/00* (2006.01)
(52) U.S. Cl. .................. 715/239; 715/249; 707/102
(58) Field of Classification Search ............. 715/513, 715/523, 234, 239, 249; 707/102, 10, 3
See application file for complete search history.

(56) References Cited

U.S. PATENT DOCUMENTS

| 4,751,740 A | 6/1988 | Wright ............... 382/180 |
| 4,864,501 A | 9/1989 | Kucera et al. ............ 704/8 |
| 4,866,777 A | 9/1989 | Mulla et al. .......... 704/206 |
| 5,185,818 A | 2/1993 | Warnock ............... 382/54 |
| 5,295,266 A | 3/1994 | Hinsley et al. ......... 718/101 |
| 5,557,722 A | 9/1996 | DeRose et al. ......... 715/513 |
| 5,579,466 A | 11/1996 | Habib et al. .......... 715/529 |
| 5,586,241 A | 12/1996 | Bauermeister et al. ... 395/167 |
| 5,781,714 A | 7/1998 | Collins et al. ......... 395/171 |
| 5,787,451 A | 7/1998 | Mogilevsky ........... 715/533 |
| 5,881,225 A | 3/1999 | Worth ................. 726/17 |
| 5,895,476 A | 4/1999 | Orr et al. ............. 707/517 |
| 6,023,714 A | 2/2000 | Hill et al. ............ 715/513 |
| 6,031,989 A | 2/2000 | Cordell .............. 717/109 |
| 6,044,387 A | 3/2000 | Angiulo et al. ........ 715/533 |

(Continued)

FOREIGN PATENT DOCUMENTS

EP 1 230 566 B1 2/2005

(Continued)

OTHER PUBLICATIONS

Ray, Erik T., "Learning XML," O'Reilly & Associates, Inc., Jan. 2001, cover, copyright, and Chapter 5, downloaded pp. 1-25.*

(Continued)

*Primary Examiner*—Laurie Ries
(74) *Attorney, Agent, or Firm*—Merchant & Gould, P.C.

(57) ABSTRACT

An application can use native field structures, which can store information such as "Creation Date of the Document", "Formula", a specially formatted number, a reference to text in another part of the document. Fields are commonly used for document automation, so that the application itself can include certain information among the contents of the document, with possibly no extra user intervention required. Thus a way can be provided to save this field definition information in a markup language (ML) document without data loss. When the format is stored in a markup language, other applications can validate the document stored in accordance with the native format. The other applications can represent the information in accordance to the degree to which they are aware of the unique properties of the application used to generate the document.

22 Claims, 5 Drawing Sheets

U.S. PATENT DOCUMENTS

| | | | | |
|---|---|---|---|---|
| 6,092,068 | A | 7/2000 | Dinkelacker | 707/100 |
| 6,119,136 | A | 9/2000 | Takata et al. | 715/513 |
| 6,141,754 | A | 10/2000 | Choy | 726/1 |
| 6,182,029 | B1 | 1/2001 | Friedman | 704/9 |
| 6,209,124 | B1* | 3/2001 | Vermeire et al. | 717/114 |
| 6,230,173 | B1 | 5/2001 | Ferrel et al. | 715/513 |
| 6,233,592 | B1 | 5/2001 | Schnelle et al. | 715/513 |
| 6,249,794 | B1 | 6/2001 | Raman | 715/500 |
| 6,336,124 | B1 | 1/2002 | Alam et al. | 715/523 |
| 6,397,232 | B1 | 5/2002 | Cheng-Hung et al. | 715/523 |
| 6,507,856 | B1 | 1/2003 | Chen et al. | 715/513 |
| 6,507,857 | B1 | 1/2003 | Yalcinalp | 715/513 |
| 6,519,617 | B1 | 2/2003 | Wanderski et al. | 715/513 |
| 6,535,896 | B2 | 3/2003 | Britton et al. | 715/523 |
| 6,538,673 | B1 | 3/2003 | Maslov | 715/853 |
| 6,613,098 | B1 | 9/2003 | Sorge et al. | 715/503 |
| 6,675,353 | B1* | 1/2004 | Friedman | 715/513 |
| 6,697,999 | B1 | 2/2004 | Breuer et al. | 715/517 |
| 6,725,423 | B1 | 4/2004 | Muramoto et al. | 715/513 |
| 6,725,426 | B1 | 4/2004 | Pavlov | 715/523 |
| 6,754,648 | B1* | 6/2004 | Fittges et al. | 707/1 |
| 6,763,500 | B2* | 7/2004 | Black et al. | 715/513 |
| 6,785,685 | B2 | 8/2004 | Soetarman et al. | 707/101 |
| 6,799,299 | B1 | 9/2004 | Li et al. | 715/513 |
| 6,829,570 | B1 | 12/2004 | Thambynayagam et al. | 703/10 |
| 6,829,745 | B2 | 12/2004 | Yassin et al. | 715/513 |
| 6,845,483 | B1 | 1/2005 | Carroll | 715/513 |
| 6,886,115 | B2 | 4/2005 | Kondoh et al. | 714/52 |
| 6,918,086 | B2 | 7/2005 | Rogson | 715/533 |
| 6,928,610 | B2 | 8/2005 | Brintzenhofe et al. | 715/517 |
| 6,938,204 | B1 | 8/2005 | Hind et al. | 715/515 |
| 6,941,510 | B1* | 9/2005 | Ozzie et al. | 715/513 |
| 6,954,898 | B1 | 10/2005 | Nakai et al. | 715/542 |
| 6,968,503 | B1 | 11/2005 | Chang et al. | 715/513 |
| 6,996,772 | B2 | 2/2006 | Justice et al. | 715/513 |
| 7,028,009 | B2 | 4/2006 | Wang et al. | 705/51 |
| 7,257,772 | B1 | 8/2007 | Jones et al. | 715/530 |
| 7,275,209 | B1 | 9/2007 | Jones et al. | 715/513 |
| 7,376,650 | B1 | 5/2008 | Ruhlen | 707/6 |
| 7,389,473 | B1 | 6/2008 | Sawicki et al. | 715/255 |
| 2001/0014900 | A1 | 8/2001 | Brauer et al. | 707/513 |
| 2001/0032217 | A1 | 10/2001 | Huang | 707/513 |
| 2002/0087702 | A1 | 7/2002 | Mori | 709/228 |
| 2002/0091725 | A1 | 7/2002 | Skok | 707/501.1 |
| 2002/0124115 | A1 | 9/2002 | McLean et al. | 709/310 |
| 2002/0184189 | A1 | 12/2002 | Hay et al. | 707/1 |
| 2003/0007014 | A1 | 1/2003 | Suppan et al. | 345/853 |
| 2003/0018668 | A1 | 1/2003 | Britton et al. | 707/513 |
| 2003/0101416 | A1 | 5/2003 | McInnes et al. | 715/513 |
| 2003/0135584 | A1 | 7/2003 | Roberts et al. | 709/218 |
| 2003/0163784 | A1 | 8/2003 | Daniel et al. | 715/514 |
| 2003/0167444 | A1 | 9/2003 | Zorc | 715/513 |
| 2003/0231626 | A1 | 12/2003 | Chuah et al. | 370/389 |
| 2004/0073871 | A1 | 4/2004 | Giannetti | 715/513 |
| 2004/0098320 | A1 | 5/2004 | Mitsuhashi et al. | 705/27 |
| 2004/0194035 | A1 | 9/2004 | Chakraborty | 715/531 |
| 2004/0205553 | A1 | 10/2004 | Hall et al. | 715/513 |
| 2004/0210818 | A1 | 10/2004 | Jones et al. | 715/500 |
| 2005/0102265 | A1 | 5/2005 | Jones et al. | 707/1 |
| 2005/0108198 | A1 | 5/2005 | Jones et al. | 707/1 |
| 2005/0108278 | A1 | 5/2005 | Jones et al. | 707/102 |

OTHER PUBLICATIONS

Glenn, Walter, "Word 2000 in a Nutshell, " O'Reily & Associates, Inc., Aug. 2000, cover, copyright, and sections 16.4 and 16.3, dowloaded pp. 1-8.*

Liberty, J. and Kraley, M., "XML Web Documents from Scratch," Que Corporation, Mar. 10, 2000, cover, copyright, chapters 1 and 2, downloaded pp. 1-16.*

Mosley, L.E., and Boodey, D.M., "Mastering Microsoft Office 97, Professional Edition," 1996, cover, copyright, pp. 87, 94-98, 103-105, 165-179, and 1114-1115.*

Watchorn, H. and Daly, P., "Word and XML: Making the 'Twain Meet," XML Europe 2001, papers, May 2001, downloaded pp. 1-11.*

Novak, U., et al. "Experimental XSLT Processor for Objects," Proceedings of the JASTED Int'l Conf. on Applied Informatics, Feb. 2002, pp. 277-282.*

XML Workshop Ltd., "Word to XML Converters," Mar. 7, 2003, downloaded pp. 1-2.*

Wen, H., "AbiWord: Open Source's Answer to Microsoft Word," Linux Devcenter.com, Mar. 14, 2002, downloaded pp. 1-3.*

Alschuler, L., "Getting the Tags In: Vendors Grapple with XML-Authoring, Editing and Cleanup," The Seybold Report on Internet Publishing, vol. 5, No. 6, Feb. 2001, reprint by Hypervision, pp. 1-6.*

Schmelzer, R., "Zap Think Briefing Note: HyperVision Automating Valid XML Document Creation within Microsoft Word," ZapThink, Feb. 18, 2002, pp. 1-6.*

YAWC Pro, "Welcome to YAWC Pro," Dec. 11, 2001, 1 page.*

"YAWC Pro 1.0 Installation & User Guide," pp. 1-11.*

"Case Study: Converting Word into XML," YAWC Pro, 1 page.*

"Case Study: Maintaining Websites with Microsoft Word," YAWC Pro, 1 page.*

"Case Study: Publishing Content to the Web and Mobile Phones," YAWC Pro, 1 page.*

"Case Study: Typesetting XML with QuarkXPress," YAWC Pro, 1 page.*

Sklar, D., "The Annotated Rainbow DTD, Rainbow version 2.5," Electronic Book Technologies, Inc., Feb. 8, 1995, pp 1-12.*

Tetrasix, "Welcome to Tetrasix Web Site," re: MajiX, Apr. 18, 2001, downloaded pp. 1-3.*

Dzuba, V., "Majix 1.0: A Word to XML Converter," Oct. 6, 1998, pp. 1-2.*

Infinity-Loop, Web Site Home Page, re: infinity-loop, Apr. 20, 2001, 1 page.*

Sun Microsystems, "The OpenOffice.org Source Project," Sun Microsystems, Inc., 2000, downloaded pp. 1-34.*

HyperVision, Ltd., "WorX2.1 Authoring Guide for XML 2001," Sep. 2001, pp. 1-29.*

Ayers, I., "AbiWord's Potential," Linux Gazette, Issue 43, Jul. 1999, last downloaded by the Examiner on Dec. 20, 2005, from: www.linuxgazette.com/issue43/ayers.html, downloaded pp. 1-4.*

Harold, Elliotte Rusty, "XML Bible," IDG Books Worldwide, 1999, pp. 369-388.*

W3C, XML Schema Part 0: Primer, W3C Recommendation, May 2, 2001, downloaded pp. 1-67.*

W3C, XML Schema Requirements, W3C Note Feb. 15, 1999, downloaded pp. 1-5.*

Ayers, I., "AbiWord's Potential," Linux Gazette, Issue 43, Jul. 1999, last downloaded from: www.linuxgazette.com/issue43/ayers.html (previously provided to Applicants).*

W3C, "XML Schema Part 0: Primer, W3C Recommendation, May 2, 2001," downloaded from: www.w3.org/TR/201/REC-xmlschema-0-20010502, downloaded pp. 1-67 (previously provided to Applicants).*

W3C, "XML Schema Requirements, W3C Note Feb. 15, 1999," downloaded from: www.w3.org/TR/NOTE-xml-schema-req, downloaded pp. 1-5 (previously provided to Applicants).*

Rohr, Paul, "RE: Styles Again", downloaded from http://www.abisource.org/mailinglists/abiword-dev/01/May/0561.html, May 2001, pp. 1-2.*

Y. Ishitani, "Document Transformation System from Papers to XML Data Based on Pivot XML Document Method", IEEE Computer Society, Seventh International Conference on Document Analysis and Recognition, 6 pgs., Aug. 3-6, 2003.

"AbiWord", http://en.wikipedia.org/wiki/AbiWord>, Oct. 19, 2005, 2 pgs.

"Creating DocBook Documents", Aug. 2, 2001, pp. 1 and 16, http://web.archive.org/web/20020615124747/www.docbook.org/tdg/en/html/ch02.html.

"Introduction to AbiWord", http://web.archive.org/web/20010608211934/www.abisource.com/help/en-US/index.htm, Jun. 8, 2001, 3 pgs.

"Introduction to XML" University of Washington Computing and Communications, copyright 1999, on the Internet as of Jun. 24, 2001, downloaded from http://web.archive.org/web/20010624123830/http://www.washington.edu/computing/training/540/xml_well.html, 1 pg.

"Star Office XML File Format Working Draft", Sun Microsystems, Inc., pp. 57, 59.

"TEI, The XML Version of the TEI Guidelines" Text Encoding Initiative [TEI] Consortium, Copyright 2001, with Introductory Note, dated Mar. 2002, downloaded from: http://www.tei-c.org.uk/Drafts/P4/driver.xml, on Nov. 25, 2006, downloaded pp. 1-93.

"XML Schema—Lecture 4 Notes", downloaded from http://www.cs.rpi.edu/~puninj/XMLJ/classes/class4/all.html, Nov. 21, 2001, pp. 1-14.

"XML Schema for AbiWord Markup Language", downloaded from http://www.abisource.com/awml.xsd, May 27, 2000, pp. 1-3.

"XML Schema for AbiWord Markup Language", http://www.abisource.com/awml.xsd>, Apr. 27, 2000, 3 pgs.

"XML Schema Part 1: Structures", W3C Recommendation, May 2, 2001, downloaded from http://www.w3.org/TR2001/REC-xmlschema-1-20010502/, pp. 1-19.

Altamura et al., "Transforming paper documents into XML format with WISDOM++", Nov. 7, 2000, IJDAR, pp. 6-12.

Altova Inc. & Altova GmbH, "XML Spy 4.0 Manual, " copyright 1998-2001, Sep. 10, 2001, downloaded from: http://www.altova.com/download.sub.--archive.html and link, pp. 18-286.

Altova Inc. & Altova GmbH, "XML Spy 4.0 Manual," copyright 1998-2001, published Sep. 9, 2001, pp. 1-401.

Cagle et al., "Professional XSL", Wrox Press Ltd., 2001, cover and copyright pages and pp. 9-21.

Case Western Reserve University (CRWU), "Introduction to HTML", Case Western Reserve University and Eric A. Meyer, Mar. 4, 2000, downloaded from web.archive.org/web/20000304042655/http://www.cwru.edu/help/introHTML/toc.html, downloaded pp. 1-157.

Castro, E., "XML for the World Wide Web, Visual Quickstart Guide", Peachpit Press, 2001, p. 245.

Castro, Elizabeth, "XML for the World Wide Web: Visual QuickStart Guide, " Oct. 23, 2000, Peachpit Press, pp.1-6.

Castro, Elizabeth, "XML for the World Wide Web", Published by Peachpit Press, 2001, pp. 182-184.

Chipr, "AbiWord—Word Processing for Everyone", http://www.kuro5hin.org/?op=displaystory;sid=2002/4/22/22406/9615>, Apr. 23, 2002, 8 pgs.

Chiyoung Seo et al.; An efficient inverted index technique for XML documents using RDBMS; Received Jan. 16, 2002; Information and Software Technology 45 (2003), Jun. 1, 2002; pp. 11-22.

Dan Frakes, "Crowd Control (Secrets)", Jun. 1, 2002, MacWorld, vol. 19, No. 6, p. 102.

Danny Heijl; The Delphi XML SAX2 Component & MSXML 3.10; Dr. Dobb's Journal, Sep. 2001; pp. 42-54.

David Eisenberg, "Using XSL Formatting Objects", Jan. 17, 2001, pp. 1a and 1, http://www.xml.com/pub/a/2001/01/17/xsl-fo/index.html?page=2.

Dev X Staff, "Twelve Dynamic HTML Lessons," downloaded from http://devx.com/projectcool/Article/18103/1763, published Jan. 1, 2001, pp. 1-3.

Harold, Rusty Elliotte, "XML Bible", IDG Books Worldwide, 1999, title page, copyright page, and pp. 1-15, 95-132, 191-200, 333-336, 352-360, and 433-567.

HV, Ltd., "WorX Standard Edition (SE) 'XML Authoring Made Easy'," HyperVision, Ltd., published on the Internet as of Jun. 3, 2001 as a PDF file linked to http://web.archive.org/web/20010603152210/www.hvltd.com/default.asp?name= - information/xml/worxseOverview.xml&display=information/xsl/default.xsl, pp. 1-9—Dead Link.

J. Geigel et al., "Automatic Page Layout Using Genetic Algorithms for Electronic Albuming", Proceedings of Electronic Imaging, Jan. 21-26, 2001 12 pgs.

James E. Powell, "Microsoft Office Beta 2 on the Horizon", WinMag.com, Nov. 3, 2000.

Jeong, Euna et al., "Semistructured Data: Induction of Integrated View for XML Data With Heterogeneous DTDs", Proceedings of the Tenth International Conference on Information and Knowledge Management, Oct. 2001, pp. 151-158.

John Lombardi, "Word Pro Excels at 'Team' Work", Info World, Jan. 8, 1996, p. 86.

Jon Bosak, "XML: The Universal Publishing Format", 1998, pp. 1-2.

Jon Udell, "Getting Traction", Jul. 12, 2002.

JP Morgenthal; XML for Data Integration; EAI Journal, Oct. 2001; pp. 13-14, 16.

Juran, J., "MML: The Modest Markup Language", Oct. 22, 2000, downloaded pp. 1-15.

Kathy Yakal, "Elegant Document Distribution", Computer Shopper, Nov. 1995, pp. 1-2.

Klink et al., "Document Structure Analysis Based on Layout and Textual Features", Sep. 25, 2000, DFKI, pp. 1a, 3, 4, and 11.

Lemay, Laura, "Teach Yourself Web Publishing with HTML 4 in 14 Days, Professional Reference Edition", Second Edition, Sams.net Publishing, 1997, pp. 778-789.

Liefke, Harmut et al., "Xmill: An Efficient Compressor for XML Data", SCM SIGMOD Record, vol. 29, Issue 2, May 2000, pp. 153-164.

Linss, Peter, "CSS Namespace Enhancements (proposal)", Jun. 1999, W3C, pp. 1-7.

M. Fernandez et al., "Advanced Technology Seminar, " p. 323 (Feb. 21, 2002).

M. Fernandez and S. Amer-Yahia; Advanced Technology Seminar 2—Techniques for Storing XML; pp. 323, 774-776.

M. Kirjavainen, "XML Browsers", http://mia.ece.uic.edu/~papers/WWW/MultimedicaStandards/XML_browsers.pdf, last accessed Mar. 14, 2005, 16 pgs.

M. Schrage, "Proxima, A presentation-oriented editor for structured documents", IPA, ISBN 12-345-6789-0, Jun. 4, 1973, pp. 1-186.

Mansfield, Ron, "Mastering Word 97 Fourth Edition", 1997, Sybex, pp. 269-270, 412, 449-457, 985-986, 1010-1011, 1028-1029, 1031-1034.

Mansfield, Ron, "Mastering Word 97 Fourth Edition", 1997, Sybex, pp. 221-222, 271-273, 278, 280, 283-284, 325-330, 539-540, 1015.

Mathias Neumuller and John N. Wilson; Improving XML Processing Using Adapted Data Structures; Oct. 7-10, 2002; pp. 206-220.

McGrath, Robert, "Representing "Binary" Data in XML", downloaded from http://ndf.ncsa.uiuc.edu/HDF5/XML/tools/binary.html, Mar. 2001, pp. 1-4.

Meyer, Eric, "Cascading Style Sheets: HTML and CSS", May 2000, O'Reilly, pp. 1-17.

Michael Champion; Storing XML in Databases; EAI Journal, Oct. 2001; pp. 53-55.

Michael Floyd, "Debugging XML Applications", Aug. 2000, www.webtechniques.com, pp. 79-81.

Microsoft, "Microsoft Word 2000", 1999, Microsoft, Screenshots 1-7, pp. 1-2.

Milbery, J., "WorX SE", XML Journal, published Feb. 4, 2001, downloaded from http://xml.sys-con.com/read/40149.htm, downloaded pp. 1-5.

Oliver Meyer, "Creating Validated XML Documents on the Fly Using MS Word", Oct. 20, 2002, pp. 113-121.

O'Reilly, "HTML & XHTML The Definitive Guide," 4th Edition, Copyright 2000, pp. 1-6, http://oreilly.jungles.ru/webdesign/xhtml/ch16_03.htm.

Patrick Marshall, "DocuShare 2.0 Makes Web Document Management Work", Sep. 27, 1999.

Pradeep Jain; "Creating XML from Microsoft Word: The Challenges", Dec. 3-8, 2000, pp. 136-144.

Robert D. Cameron; REX: XML shallow parsing with regular expressions; Markup Languages: Theory & Practice 1.3, Summer 1999; pp. 61-88.

Rodriguez, M., "XML: Twig", xmltwig.com, copyright 2003, downloaded pp. 1-4, web.archive.org/web/20030422002120/http://www.xmltwig.com/xmltwig/tools/xml_spellcheck.

Rusty Elliotte, "XML Bible", IDG Books Worldwide, Inc., 1999, pp. 1-12, 120-127, 333-335.

Scott Boggan and Micael De Laurentis, A System for Matching static or distortable fonts; May 1994; pp. 1-9; http://www.byte.com/art/940/sec12/art1.htm.

Sihem Amer-Yahia, Mary Fernandez, Divesh Srivastava and Yu Xu; Pix: A System for Phrase Matching in XML Documents: A Demonstration; 2003 IEEE; pp.774-776.

Simpson, J., "Just XML", Prentice Hall, Second Edition, 2001, cover, copyright page and p. 31.

Star Office XML File Format Working Draft, Sun Microsystems, Inc., pp. 1, 19 and 196.

Sun Microsystems, "StarOffice XML File Format Working Draft", Jan. 2001, Draft 10, pp. 19, 89, 142, and 234, http://web.archive.org/web/20010603030227/xml.openoffice.org/xml_specification_draft.pdf.

Sun Microsystems, "StarOffice XML File Format Working Draft", Jan. 2001, Draft 10, pp. 19 and 234, http://web.archive.org/web/20010603030227/xml.openoffice.org/xml_specification_draft.pdf.

Sun Microsystems, "StarOffice XML File Format Working Draft", Jan. 2001, Draft 10, pp. 48, 49, 51, 54-58.

Sun Microsystems, "The OpenOffice.org Source Project", Sun Microsystems, Inc., 2000, downloaded pp. 1-34.

Surajit Chaudhuri and Kyuseok Shim; Storage and Retrieval of XML Data using Relational Databases; Advanced Technology Seminar 4; Abstract; Mar. 5, 2003; p. 802.

Torsten Grabs et al.; XMLTM: Efficient Transaction Management for XML Documents; CIKM'02, Nov. 4-9, 2002; pp. 142-152.

Ullas Nambiar et al.; Efficient XML Data Management: An Analysis; EC-Web 2002, LNCS 2455; pp.87-98.

Unicode Inc., "Unicode Technical Reports", Sep. 21, 2002, pp. 1, 2, 638, 642, and 644.

University of Georgia Center for Continuing Education, "Exploring the World-Wide Web, Hypertext Markup Language", Feb. 24, 1999, downloaded pp. 1-7.

Uros Novak et al., "Experimental XSLT Processor for Objects", Proceedings of the IASTED International Conference, Applied Informatics, Feb. 18-21, 2002, pp. 277-282.

V. Turau, "Making legacy data accessible for XML applications", University of Applied Sciences, Department of Computer Science, Wiesbaden, Germany, 1999, pp. 1-11.

Volkan Atalay and Erkan Arslan; An SGML Based Viewer for Form Documents; 1999 IEEE Jul. 1999; pp. 201-204.

W. Wadge, "Intentional Markup Language", Proceedings of the Third International Workshop, DCW 2000, Quebec City, Canada, Jun. 19-21, 2000, pp. 82-89.

W3C, Fonts, Jan. 24, 2001, W3C, pp. 1-4, http://web.archive.org/web/20010124044900/ttp://www13.w3.org/TR/REC-CSS2/fonts.html#matching.

Walther, P., "XML Dokumente in Microsoft Word mit neuem Produkt der struktur AG kostenlos testen", http://www.contentmanager.de/magazine/news_h2695_xml_dokumente_in_microsoft_word_mit_neuem.html>, Jun. 5, 2002, 2 pgs.

WayBack Machine, Feb. 15, 2006, p. 1, http://web.archive.org/web/*/http://www.w3.org/TR/REC-CSS2/fonts.html—, Dead Link.

White, B. et al., "Standard Structural Elements" from "Web Content Accessibility Tips and Tricks", May 1, 2001, downloaded pp. 1-4.

XHTML Examples, "XHTML explained—XHTML Examples," downloaded from http://web.archive.org/web/20020603200919/http://www.javascriptkit.com/howto/xhtml_intro4.Shtml, published Jun. 3, 2002, pp. 1-3.

Xin Zhang et al.; Clock: Synchronizing Internal Relational Storage with External XML Documents; 2001 IEEE Jun. 2001; pp. 111-118.

Xmetal 1.0, Webreference.com, Oct. 29, 1999, downloaded pp. 1-2, www.webreference.com/html/watch/xmetal/5.html.

\* cited by examiner

Fig. 5

REPRESENTING FIELDS IN A MARKUP LANGUAGE DOCUMENT

RELATED APPLICATIONS

This patent application is a continuation-in-part application under 35 United States Code § 120 of U.S. patent application Ser. No. 10/187,060 filed on Jun. 28, 2002, which is incorporated herein by reference. An exemplary schema in accordance with the present invention is disclosed in a file entitled Appendix.txt in a CDROM attached to an application entitled "Mixed Content Flexibility," Ser. No. 10/726,077, filed Dec. 2, 2003, which is hereby incorporated by reference in its entirety.

COMPUTER PROGRAM LISTING APPENDIX

A computer listing is included in a Compact Disc appendix in the attached CD ROM (quantity of two) in IBM-PC using MS-Windows operating system, containing file Appendix-.txt, created on Dec. 26, 2006, containing 12,288 bytes (Copy 1 and Copy 2) and is hereby incorporated by reference in its entirety.

BACKGROUND OF THE INVENTION

Markup Languages have attained wide popularity in recent years. One type of markup language, Extensible Markup Language (XML), is a universal language that provides a way to identify, exchange, and process various kinds of data. For example, XML is used to create documents that can be utilized by a variety of application programs. Elements of an XML file have an associated namespace and schema.

In XML, a namespace is a unique identifier for a collection of names that are used in XML documents as element types and attribute names. The name of a namespace is commonly used to uniquely identify each class of XML document. The unique namespaces differentiate markup elements that come from different sources and happen to have the same name.

XML Schemata provide a way to describe and validate data in an XML environment. A schema states what elements and attributes are used to describe content in an XML document, where each element is allowed, what types of text contents are allowed within it and which elements can appear within which other elements. The use of schemata ensures that the document is structured in a consistent manner. Schemata may be created by a user and generally supported by an associated markup language, such as XML. By using an XML editor, the user can manipulate the XML file and generate XML documents that adhere to the schema the user has created. XML documents may be created to adhere to one or more schemata.

The XML standard is considered by many as the ASCII format of the future, due to its expected pervasiveness throughout the hi-tech industry in the coming years. Recently, some word-processors have begun producing documents that are somewhat XML compatible. For example, some documents may be parsed using an application that understands XML. However, much of the functionality available in word processor documents is not currently available for XML documents.

SUMMARY OF THE INVENTION

The present invention is generally directed towards a method for representing an application's native field structures, such as "Creation Date of the Document", "Formula", a specially formatted number, a reference to text in another part of the document, or others in a markup language document. Fields are commonly used for document automation, so that the application itself includes certain information among the contents of the document, with possibly no extra user intervention required. The method of the invention provides a way to save this field definition information in a markup language (ML) document without data loss, while allowing the field structures to be parsed by ML-aware applications and to be read by ML programmers.

DETAILED DESCRIPTION OF THE PREFERRED EMBODIMENT

Throughout the specification and claims, the following terms take the meanings explicitly associated herein, unless the context clearly dictates otherwise.

The terms "markup language" or "ML" refer to a language for special codes within a document that specify how parts of the document are to be interpreted by an application. In a word-processor file, the markup language specifies how the text is to be formatted or laid out, whereas in a particular customer schema, the ML tends to specify the text's meaning according to that customer's wishes (e.g., customerName, address, etc). The ML is typically supported by a word-processor and may adhere to the rules of other markup languages, such as XML, while creating further rules of its own.

The term "element" refers to the basic unit of an ML document. The element may contain attributes, other elements, text, and other building blocks for an ML document.

The term "tag" refers to a command inserted in a document that delineates elements within an ML document. Each element can have no more than two tags: the start tag and the end tag. It is possible to have an empty element (with no content) in which case one tag is allowed.

The content between the tags is considered the element's "children" (or descendants). Hence, other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that will not contain additional elements, or be treated as a text node.

Illustrative Operating Environment

Figure 1:
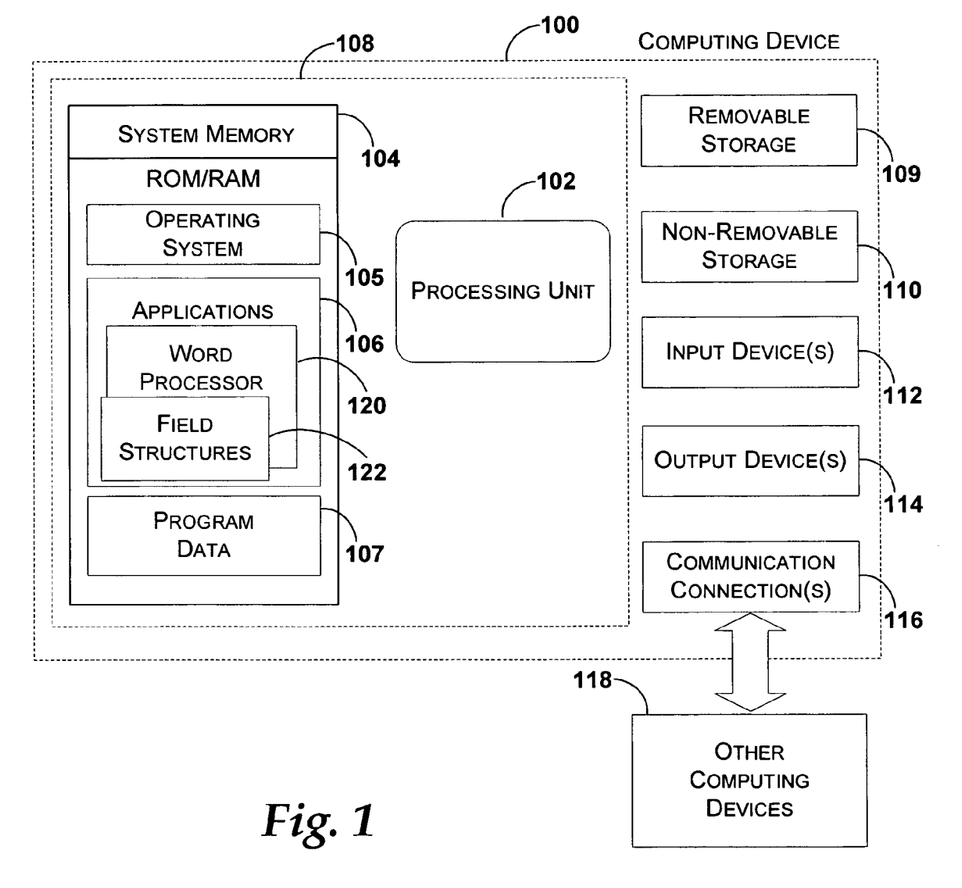
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a word-processor application 120 that further includes field structures 122. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Generally, the present invention is directed at representing field structures in an ML document. The ML document may be read by applications that do not share the same schema that created the document. The application not sharing the same schema may parse the field structures, regardless of whether or not the fields are understood.

Figure 2:
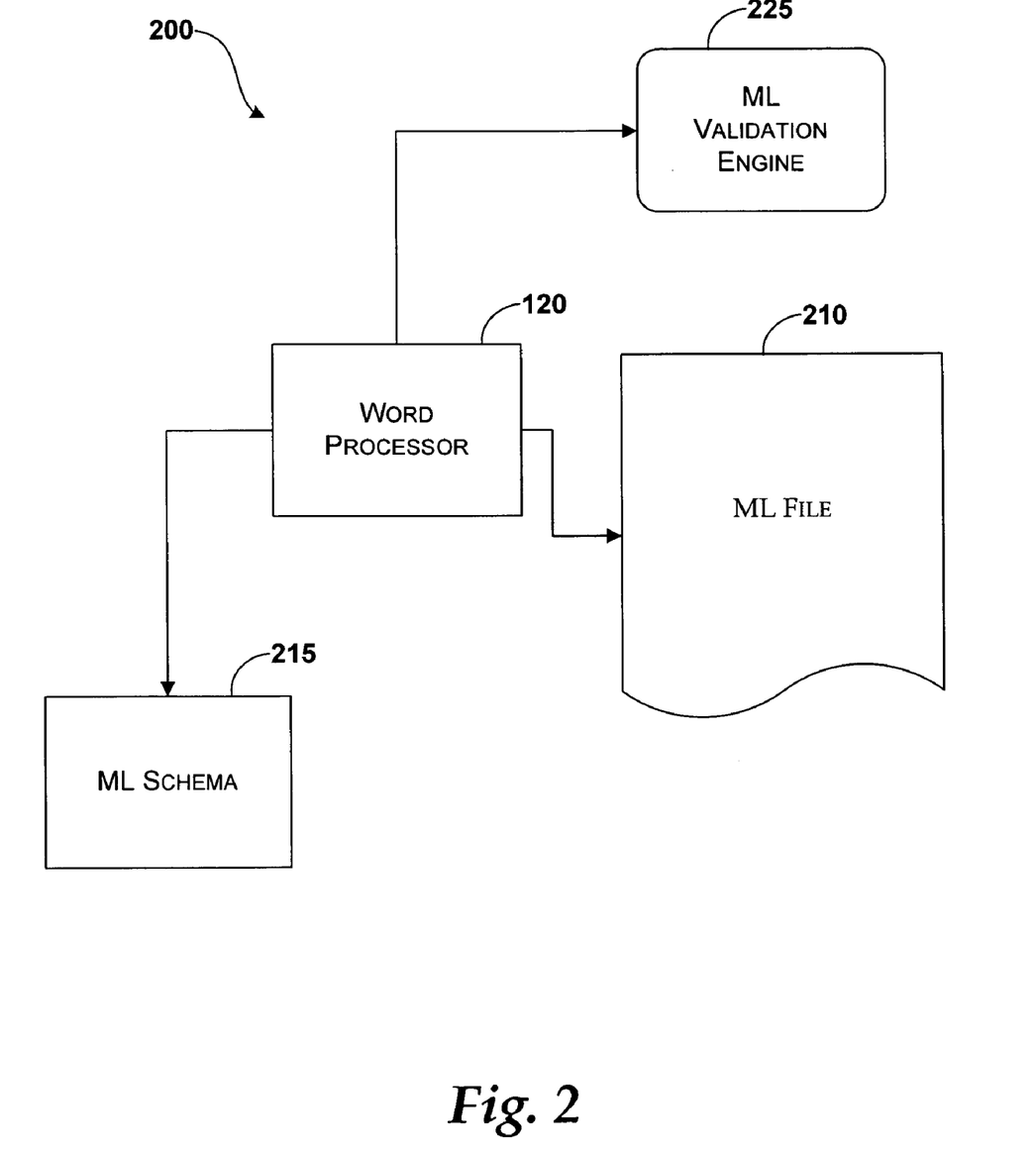
FIG. 2 is a block diagram illustrating an exemplary environment for practicing the present invention.

FIG. 2 is a block diagram illustrating an exemplary environment for practicing the present invention. The exemplary environment shown in FIG. 2 is a word-processor environment 200 that includes word-processor 120, ML file 210, ML Schema 215, and ML validation engine 225.

In one embodiment, word-processor 120 has its own namespace or namespaces and a schema, or a set of schemas, that is defined for use with documents associated with word-processor 120. The set of tags and attributes defined by the schema for word-processor 120 define the format of a document to such an extent that it is referred to as its own native ML. Word-processor 120 internally validates ML file 210. When validated, the ML elements are examined as to whether they conform to the ML schema 215. A schema states what tags and attributes are used to describe content in an ML document, where each tag is allowed, and which tags can appear within other tags, ensuring that the documentation is structured the same way. Accordingly, ML 210 is valid when structured as set forth in arbitrary ML schema 215.

ML validation engine 225 operates similarly to other available validation engines for ML documents. ML validation engine 225 evaluates ML that is in the format of the ML validation engine 225. For example, XML elements are forwarded to an XML validation engine. In one embodiment, a greater number of validation engines may be associated with word-processor 120 for validating a greater number of ML formats.

Representing Fields in a Markup Language Document

The present invention generally provides a method to represent an application's native field structures in markup language (ML) such as XML. The field structures may be parsed by applications that understand the markup other than the application that generated the ML file. Fields are commonly used for document automation, so that the application itself includes certain information among the contents of the document, with possibly no extra user intervention required. Fields may be a very powerful feature making the document authoring or editing process much more efficient.

Fields are elements of the content of a document, whose purpose is to automatically generate or modify the content, or its appearance, depending on various conditions and/or settings specified by the user. Fields may be very simple or very complex.

A defining characteristic of a field is that it is updatable. For example, a "LastSavedBy" field may insert the name of the last person who saved the document at the location of the field. When a different person saves the document from the one who saved it last time, the name inserted by the field is automatically replaced with the name of the latest user. The field therefore generates and modifies the content of the document depending the identity of the person saving the document.

A "Ref" field (reference) is a more complex example. The field's result is text which is a "linked" copy of text from another place of the document, identified by a named bookmark. As soon as the original text changes, the text inserted by the field changes as well. The "ref" field may also affect the formatting of the copied text (e.g., by making the copied text uppercased).

An even more complex example is a field which creates a table of contents for the document by: reproducing all the headings used in the document in a single location; organizing the headings according to their level to expose the hierarchy of the document; changing the formatting of the headings; automatically including the correct page number with each heading in the table of contents; and determining the numbering style to use for the table of contents. A table of contents that is the result of such a field is automatically updatable and self-organizing based on the contents of the document. Therefore, the maintenance of a table of contents is automated so that the user is not required to create and maintain the table of contents manually.

Certain fields may refer to one another. For example, a field whose result is the Index section of a document relies on the existence of fields throughout the document that mark index entries. Also, certain fields may be nested one inside of another and work together in a "recursive" manner to create the desired result.

In order for an application to support the concept of fields, the application represents each field internally by a structure mirroring field properties. A field structure generally consists of the following two major parts:
1. field instructions
2. field result "Field instructions" comprise the portion of a field containing pieces of information such as:
1. the name of the field;
2. zero or more arguments on which the field operates (e.g., file names, style names, bookmark names, numbers, literal text, and others); and
3. zero or more options specific to the field that further modify the behavior of the field (e.g., formatting options, numbering style settings, and others).

The "field result" comprises the portion of the field which contains the result of the operation performed by the field. The field result may simply be a number, but also may be as arbitrarily rich and complex as a whole fully formatted document or OLE (Object Linking and Embedding) object. The result is the part that is updated by the field when the value of the arguments of the field changes.

Since a field itself is an editable part of a document, it coexists with the surrounding content. The field may be separated from the surrounding content by a field start and field end marks. Also, the instructions are separated from the result. In a first embodiment, the separators are visible to the user. In a second embodiment, the separators are not visible to the user. Correspondingly, in other embodiments, the instructions may or may not be visible to the user. Typically, a user is able to choose between a view where only field instructions are visible and one where only field results are displayed.

Based on how the instructions portion of a field is structured, fields are divided into two major categories:
    simple fields—The instructions portion only contains instructions, and not richly formatted content or other embedded fields.
    complex fields—The instructions portion contains richly formatted content or other embedded fields.

The present invention provides a method for saving all the field information described above as ML without losing any data, by mapping the application's internal field structures described above to saved ML markup.

Figure 3:
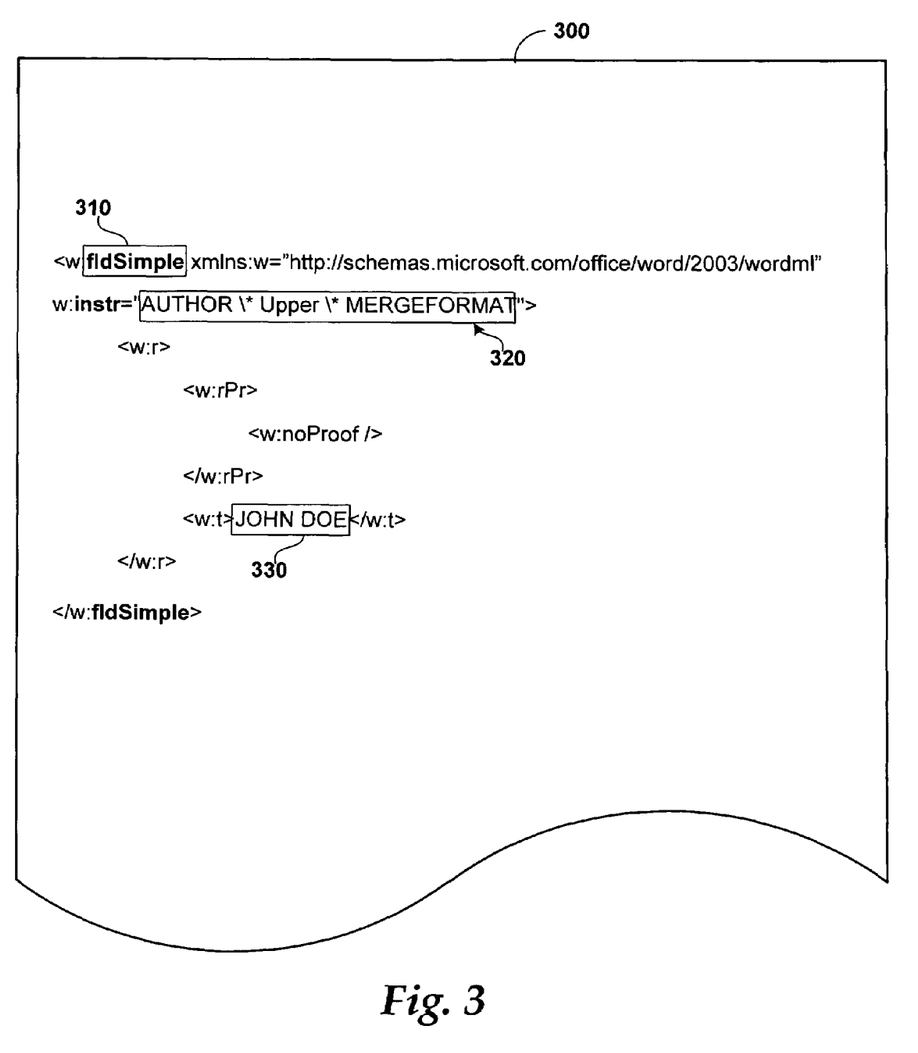
FIG. 3 illustrates an exemplary portion of an ML file that provides representation of a simple field within ML file.

The present invention represents the fields in ML depending on whether the field is a "complex" field or a "simple" one. FIG. 3 illustrates an exemplary portion of an ML file that provides representation of a simple field within ML file, in accordance with aspects of the present invention.

In the example shown, the simple field is represented by fldSimple element 310 containing instructions 320 and result 330. Instructions 310 of the field are written out as the string value of the instr attribute. Result 330 of the field is arbitrarily rich ML content written out as the child of fldSimple element 310. In the example given, the ML markup represents an "Author" field, whose function is to insert the name of the document author (John Doe) into the document, in upper case. Other field instructions and results may be used within a simple field, and a simple field may correspond to elements other than the fldSimple element without departing from the scope of the present invention.

Figure 4:
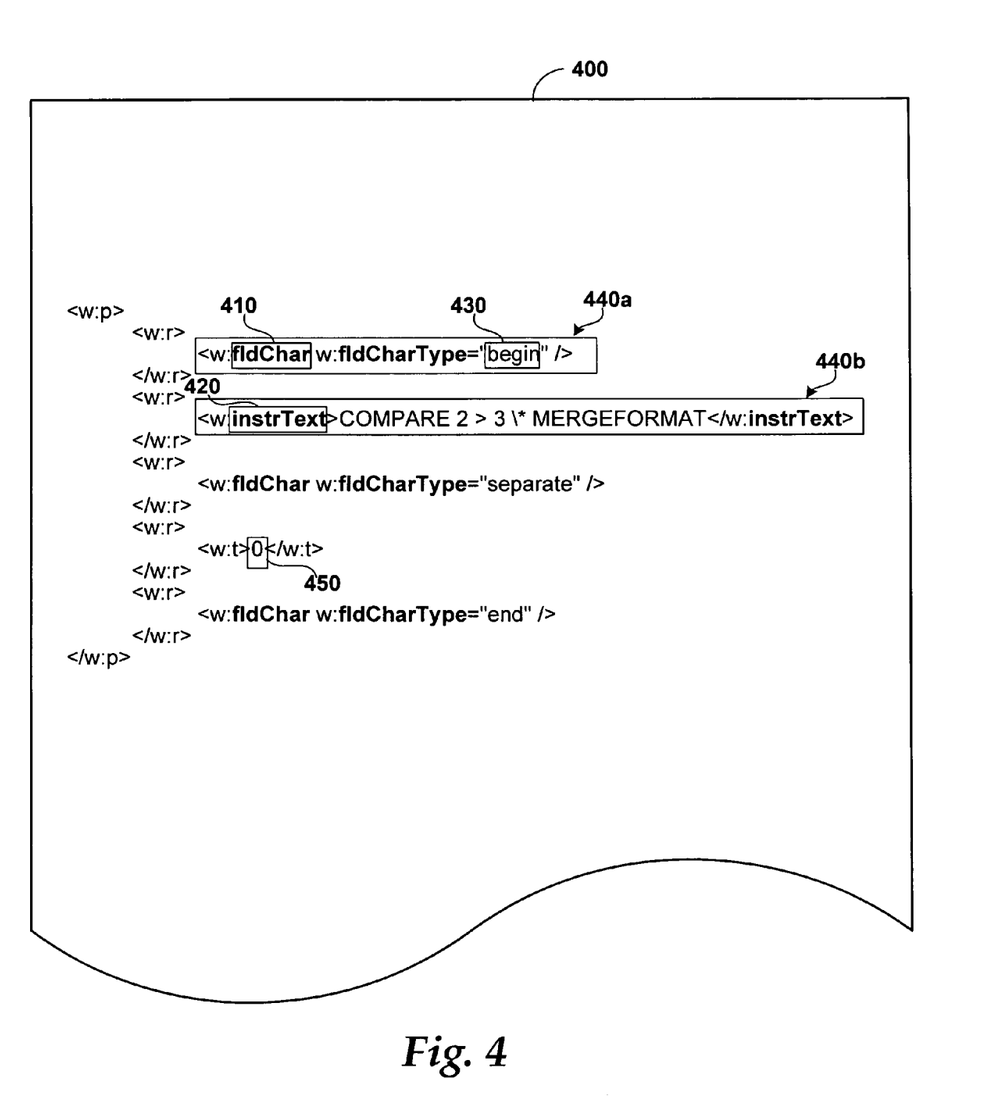
FIG. 4 illustrates an exemplary portion of an ML file that provides representation of a complex field within ML file.

FIG. 4 illustrates an exemplary portion of an ML file that provides representation of a complex field within ML file, in accordance with aspects of the present invention. The example includes the presence of arbitrarily rich ML markup inside and around the instructions 440*a* and 44*b* and the result 450. The field's ML markup can co-exist and be intertwined with other ML markup, as shown in FIG. 4.

As shown, instructions 440 of a complex field themselves may contain arbitrarily rich content, including other fields. Accordingly, ML for a complex field includes the definition of two empty elements such as fldChar 410 and instrText 420. Element fldChar 410 marks the beginning of the field, the boundary between the instructions and the result, or the end of the field, depending on the value of its fldCharType attribute 430 (e.g., "begin", "separate", "end", etc.). Element instrText 420 contains the ML markup for the arbitrarily rich instructions of the field.

In one embodiment, the elements appear in the following specific order for the field representation to be valid:
    <fldchar fldCharType="begin"/>
    . . .
    <instrText>
    Field instructions go here . . .
    </instrText>
    . . .
    <fldChar fldCharType="separate"/>
    Field result goes here . . .
    <fldChar fldCharType="end"/>

The actual contents of the field instructions may vary from application to application, depending on the types of fields the application supports.

The attached appendix is a listing of an exemplary portion of schema for generating the fields, in accordance with aspects of the present invention.

Figure 5:
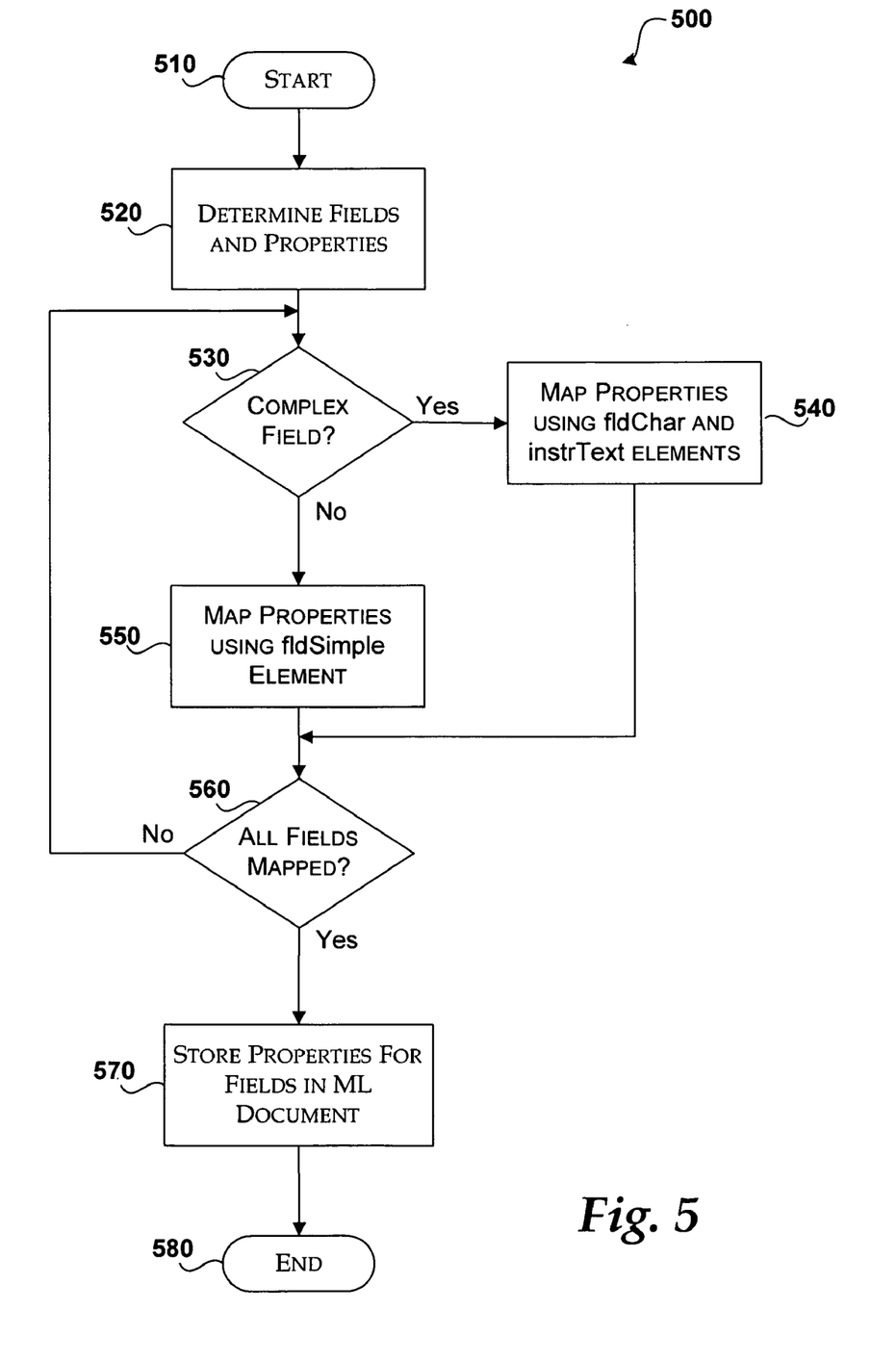
FIG. 5 shows an exemplary flow diagram for representing field structures in a ML document, in accordance with aspects of the invention.

FIG. 5 shows an exemplary flow diagram for representing field structures in a ML document, in accordance with aspects of the invention. After start block 510, the process flows to block 520 where the fields used in a document such as a word-processor document, are determined. The fields used within a document may include many different fields, including those that are not natively supported by later applications parsing the document. Once the fields are determined processing proceeds to decision block 530.

At decision block 530, a determination is made whether each field used is a complex field. When the field being examined is a complex field, processing moves to block 540. However, if the field is not a complex field, the field is a simple field and processing moves to block 550. In another embodiment, the fields may be categorized according to fields other than complex fields and simple fields.

At block 540, the properties of the complex field (when the field is a complex field) are mapped into elements, attributes, and values of the ML file. As an example, the fields may include "Creation Date of the Document", "Formula", a specially formatted number, a reference to text in another part of the document, or others that each have their own associated properties. Two elements used in mapping the properties of a complex field are the fldChar element and the instrText element (see FIG. 4). The fields and the properties associated with the fields may change from page to page, section to section, chapter to chapter and the like. There may be more than one mapping, therefore, per document. Once the complex field properties are mapped, or written to the ML file, processing advances to decision block 560.

At block 550, the properties of the simple field (when the field is a simple field) are mapped into elements, attributes, and values. An elements used in mapping the properties of a simple field is the fldSimple element (see FIG. 3). As previously stated, the fields and the properties associated with the fields may change from page to page, section to section, chapter to chapter and the like. There may be more than one mapping, therefore, per document. After the simple field properties are mapped, processing advances to decision block 560.

At decision block 560, a determination is made whether all the fields of the document have had their properties mapped to elements, attributes, and values. If not all of the fields have been processed, processing returns to block 530 where the category of the next field is determined. However, if all the fields have been processed, then the process then moves to block 570.

At block 570, the properties of the fields are stored in a ML document that may be read by applications that understand the ML. Once the properties are stored, processing moves to end block 580 and returns to processing other actions.

In another embodiment, the properties of each field are mapped to elements, attributes, and values without a distinction being made between complex fields and simple fields.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for representing field structures in a markup language document, comprising:
   inputting at a computing device an application document that has been generated by a word-processing application that uses a file format that is specific to the application, wherein the file format is in a non-markup language format that is native to the application and the file format comprises unique properties for describing fields within the document, wherein the unique properties are defined by the application;
   determining at the computing device one or more unique properties corresponding to a field that relates to at least one section of the application document;
   determining at the computing device whether the field is a complex field or a simple field; mapping the determined properties of the field into at least one of a markup language element, an attribute, and/or a value, wherein the field is designated with a simple field markup language element when the field is determined to be a simple field; and
   storing at the computing device the mapped properties of the field in the markup language document whereby applications different from the application can understand the mapped field properties stored in the markup language document.

2. The method of claim 1, wherein an instruction portion of the field comprises at least one of richly formatted content and embedded additional fields when the field is a complex field.

3. The method of claim 1, wherein an instruction portion of the field excludes richly formatted content and embedded additional fields when the field is a simple field.

4. The method of claim 1, wherein the simple field markup language element used to designate the field includes a fldSimple element when the field is determined to be a simple field.

5. The method of claim 1, wherein the application itself includes file information among the contents of the document without using text supplied by a user.

6. The method of claim 1, further comprising:
   determining properties corresponding to an additional field that relates to at least one section of the application document;
   mapping the determined properties of the additional field into at least one of a markup language element, an attribute, and/or a value; and
   storing the mapped properties of the additional field in the markup language document.

7. The method of claim 1, further comprising:
   determining whether properties associated with all fields of the application document have been stored in the markup language document; and
   processing further fields when the properties associated with all fields have not been stored in the markup language document.

8. The method of claim 1, wherein the properties of the fields stored in the markup language document are understood by an application that understands the markup language when the field is not native to the application.

9. The method of claim 1, wherein the markup language document is manipulated on a server to substantially reproduce the field of the application document notwithstanding the presence of an application that generated the markup language document.

10. A computer-readable storage medium for representing fields in a markup language document, comprising:
    inputting an application document that has been generated by a word-processing application that uses a non-markup language file format that is specific to the application;
    determining properties relating to one or more fields used within the application document, wherein the field comprises unique properties are defined by the application;
    determining whether the field is one of a complex field and a simple field;
    writing the properties into at least one of a markup language element, an attribute, and a value, wherein the field is designated with a simple field markup language element when the field is determined to be a simple field; and
    storing the properties in the markup language document such that the fields of the application document are substantially maintained when the markup language document is parsed by an application that is different from the application used to generate the application document.

11. The computer-readable storage medium of claim 10, wherein the properties of the fields stored in the markup language document are understood by an application that understands the markup language when the field is not native to the application.

12. The computer-readable age medium of claim 10, wherein the markup language document is manipulated on a server to substantially reproduce the field of the application document notwithstanding the presence of the word-processing application that generated the markup language document.

13. The computer-readable storage medium of claim 10, wherein an instruction portion of the field comprises at least one of richly formatted content and embedded additional fields when the field is a complex field.

14. The computer-readable storage medium of claim 10, wherein an instruction portion of the field excludes richly formatted content and embedded additional fields when the field is a simple field.

15. The computer-readable storage medium of claim 10, wherein the simple field markup language element used to designate the field includes a fldSimple element when the field is determined to be a simple field.

16. The computer-readable storage medium of claim 10, further comprising representing the field with at least one of a fldChar element and instrText element when the field is determined to be a complex field.

17. The computer-readable storage medium of claim 10, further comprising:
   determining properties corresponding to an additional field that relates to at least one section of the application document;
   determining whether the additional field is one of a complex field and a simple field;
   mapping the properties of the additional field into at least one of a markup language element, an attribute, and a value; and
   storing the properties of the additional field in the markup language document.

18. A system for representing fields in a markup language document, said system tangibly embodied on a computing device and comprising:
   an application that is configured to:
      input an application document that has been generated by a word-processing application that uses a non-markup language file format that is specific to the application;
      determine properties relating to a field included in at least one section of the application document, wherein the field comprises unique properties are defined by the application
      determine whether the field is one of a complex field and a simple field; map the properties into at least one of a markup language element, an attribute, and a value, wherein the field is designated with a simple field markup language element when the field is determined to be a simple field;
      store the properties in the markup language document; and a validation engine configured to validate the markup language document.

19. The system of claim 18, wherein the properties of the fields stored in the markup language document are understood by an additional application that understands the markup language when the field is not native to the additional application.

20. The system of claim 18, wherein an instruction portion of the field comprises at least one of richly formatted content and embedded additional fields when the field is a complex field.

21. The system of claim 18, wherein an instruction portion of the field excludes richly formatted content and embedded additional fields when the field is a simple field.

22. The system of claim 18, wherein the markup language document is manipulated on a server to generate the field of the application document notwithstanding the presence of the application that generated the markup language document.

* * * * *